Feb. 20, 1945.     R. MESTAS     2,369,909
ELECTRIC GAUGE
Original Filed Sept. 14, 1937
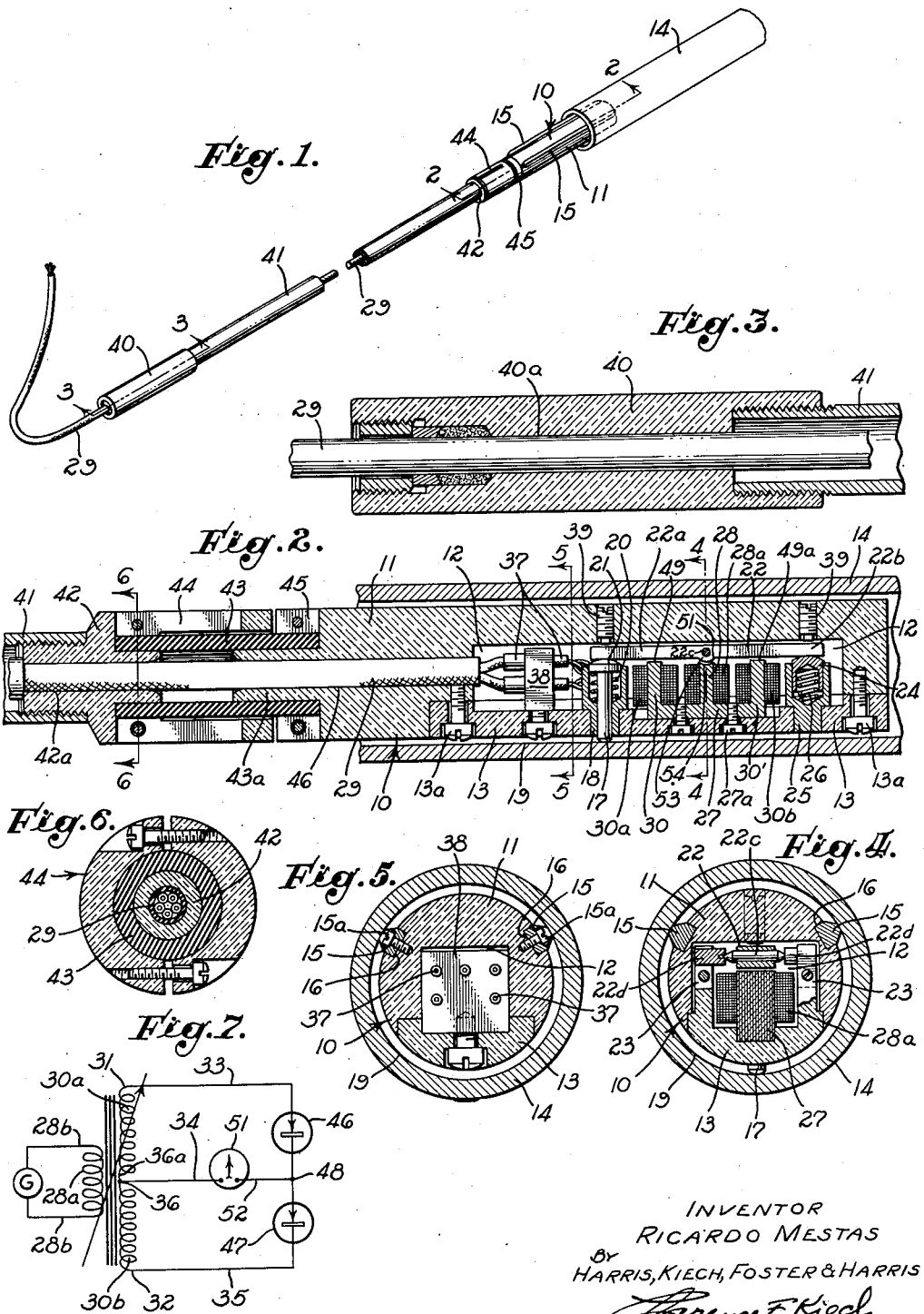
INVENTOR
RICARDO MESTAS
BY
HARRIS, KIECH, FOSTER & HARRIS
*Lawrence F. Kiech*
FOR THE FIRM
ATTORNEYS.

Patented Feb. 20, 1945

2,369,909

UNITED STATES PATENT OFFICE 2,369,909

ELECTRIC GAUGE

Ricardo Mestas, Los Angeles, Calif., assignor to Kobe, Inc., Huntington Park, Calif., a corporation of California Original application September 14, 1937, Serial No. 163,807. Divided and this application January 2, 1942, Serial No. 425,423

18 Claims. (Cl. 33—178)

This invention relates to electric gauges. Present-day manufacturing methods require a high degree of precision in the machining of parts of fabricated articles. A satisfactory gauge must not only accurately respond to extremely small deviations in dimension, but such deviations must be amplified and visually indicated to the operator. And the gauge for practical success must be simply and inexpensively constructed, and compact and convenient to apply to the object gauged.

An object of my invention is to provide a gauge with these qualities of accuracy, sensitiveness, economy of cost, compactness, and convenience. The gauge is of the electric type and utilizes the mechanical movement of a gauge element as it follows the surface to be gauged to vary the air gap of a magnetic circuit, which, in turn, causes variations in current, which variations can be accurately indicated by a suitable meter.

One of the objects of my invention is to provide electrical apparatus which will amplify and accurately indicate the deviations in dimension of the gauged object, and which at the same time will comprise a minimum of electrical elements of simple and standard construction.

Another object is to provide an electrical apparatus which will measure the electric potential of alternating current coils by a direct current galvanometer, so as to secure the advantage of directional indications and a high degree of sensitiveness of this type of potential meter.

Another object of my invention is to provide an arrangement of electrical devices which will measure deviations in dimension of the gauged object without being affected by incidental variations in voltage of the current from the source of supply.

Another purpose is to provide such an arrangement of electrical elements that a varying potential may be produced by a few small parts conveniently located in a small housing which may be applied in restricted spaces.

Another object is to provide a gauge housing which will be small, will have suitable mounting of the electrical and mechanical parts, and which will protect these parts from mechanical injury and from dirt and other foreign matter.

Another object is to provide for ready assembly and dismantling of the electrical and mechanical parts and for convenient accessibility for their inspection and repair.

Still another object is to afford a gauge which may be readily inserted within the internal bore of long casings and other cylindrical objects of which it is desired to gauge the internal dimensions.

Another object is to provide in a gauge an arrangement and combination of movable and stationary work-contacting parts which will accurately follow and indicate variations in the internal diameter of a hollow cylindrical object, with means for amplifying and visually indicating these variations.

Another advantage of my invention lies in the construction and arrangement of parts by which I utilize pieces of standard pipe for rendering the gauge capable of insertion within tubular objects of relatively great length, and by which the conductor wires of an electric gauge may be disposed in protected positions within the pipe and other gauge parts.

The drawing and description are of one embodiment of my invention. They illustrate and describe a gauge for measuring the internal diameter of cylindrical casings, sleeves, or tubing such as are used in the manufacture, among other things, of pumps, and which must be machined with a high degree of accuracy and a minimum of tolerance. It will, however, be readily appreciated that, by obvious alterations in the design of the gauge housing and gauge element, some of the principles of my invention, as outlined in some of the claims, can be embodied in a gauge for measuring the external diameter of tubing or pipes, as well as in gauges of many kinds for detecting deviations in plane surfaces, and for measuring the thickness and other dimensions of fabricated parts.

In the drawing,

Figure 1 is a perspective view of a gauge embodying my invention;

Figure 2 is a longitudinal cross-sectional view taken along the line 2—2 of Figure 1;

Figure 3 is a longitudinal cross-sectional view of the gauge handle taken along the line 3—3 of Figure 1;

Figure 4 is a cross-sectional view along the line 4—4 of Figure 2;

Figure 5 is a cross-sectional view along the line 5—5 of Figure 2;

Figure 6 is a cross-sectional view along the line 6—6 of Figure 2; and

Figure 7 is a diagram of the electrical circuits of the gauge.

The invention provides a gauge housing 10 including a cylindrical body 11 formed with an internal chamber 12 which is rectangular in cross section, as viewed in Figure 5. Cooperating with the body 11 in forming the housing 10 is a tight-fitting cover 13 which is removably secured to the body by screws 13a to close the chamber 12, this cover 13 providing an arcuate external face conforming with the body 11 to provide a generally cylindrical housing 10 adapted to be inserted within a piece of cylindrical tubing 14 which, in this example, is the article to be gauged. The body 11 and cover 13 form a dirtproof housing for the mechanically movable parts and the electromagnetic elements of the gauge.

Two elongated guide means in the form of lugs or shoes 15 are rigidly secured by screws 15a in two grooves 16 formed longitudinally in the exterior wall of the body at an angular interval of about 120° from each other. A movable gauge element or work-contacting means is formed by a plunger 17 slidably mounted in a sleeve 18 which is rigidly secured to the cover 13, and this plunger is disposed in a radial plane angularly midway between the guide means 15. This plunger is reciprocally movable longitudinally along a radial line of the gauge housing 10, and is thus moved by variations in the bore diameter of the tubing 14 or by elevations or depressions in the internal face 19 of the tubing.

A spring 20, seated in a recess in the sleeve 18, bears upon the lower face of a rounded inner head 21 of the plunger 17, and holds it at all times resiliently in contact with the under face of one end 22a of an electromagnetic armature 22. This armature comprises a movable element and carries a pin 22c pivoted in two sockets 22d which are adjustably clamped between bifurcations of two inwardly-extending arms 23 secured to the cover 13, as by being made integral therewith. The armature 22 is thus free to oscillate through a small angle under the action of the plunger 17. By this construction, the plunger or gauge element and the armature are placed in mechanically operative relationship.

The underside of the other end 22b of the armature has a bearing engagement with an engagement means shown as a hollow cylindrical plunger 24 slidably mounted in a sleeve 25 which is rigidly secured to the cover 13, all in a manner similar to the assembly of the plunger 17, and similarly provided with a spring 26 tending to elevate the plunger 24, which is held in constant resilient contact with the armature end 22b. The spring 26, being of greater strength than spring 20, acts to hold the guide means 15 and plunger 17 in constant sliding contact with the internal wall of the tubing or sleeve to be gauged, overcoming the gravity effect of the weight of the gauge when it is used horizontally and with the movable plunger 17 disposed at the bottom of the gauge. At the same time, the action of the spring 20 permits the plunger 17 to rise and fall with variations in the diameter of the tested article, and thereby to slightly oscillate the armature 22. The plungers 17 and 24 tend to move the armature in opposite directions of rotation. Adjustable threaded stops 39, mounted in the body 11, serve to limit the movement of the armature.

A laminated magnetic core 27, with the general configuration or shape of a capital letter E, is fastened by screws 27a to the inner wall of the cover 13. About the middle leg 28 of this core is disposed a primary coil 28a connected with a source of alternating current through conductors 28b in a cable 29, as shown diagrammatically in Figure 7. The two outside legs 30, 30' of the core are surrounded respectively by two identically-formed secondary coils 30a, 30b connected additively in series with each other. The core and primary and secondary coils constitute a three pole electromagnet, and the two secondary coils in cooperation with the primary coil, when the latter is energized, constitute two sources of electric potential. Three conductors 33, 34, and 35, lead from these secondary coils through the cable 29 to the outside. Conductor 33 is connected to the outer terminal 31 of one coil; conductor 35 is connected to the outer terminal 32 of the other coil; and conductor 34 is connected at 36 to the conductor 36a, which is the series connection between the two secondary coils. To obviate tensile stress upon the conductor leads, they are secured to terminals 37 retained by an insulating conductor terminal plate 38 mounted upon the inner wall of the cover 13.

The armature 22 is formed with a downwardly-projecting arcuate boss 53, with its rounded lower face 51 concentric with the pivot pin 22a upon which it is mounted. The axis of this pin is immediately above and in the transverse central plane of the core leg 28, which is formed at its upper end with a mating arcuate surface 54, which preferably contacts or nearly contacts the surface 53. The axis of the pin is also perpendicular to the central longitudinal plane of the core base and legs. By virtue of this mounting of the armature, the air gap between the core leg and the central portion of the armature throughout its range of oscillatory movement is either of zero or a very small and constant magnitude.

A handle 40 formed with a bore 40a therethrough is threadedly secured to a pipe 41 of any desired length, depending upon the length of the tubing or casing to be gauged, which pipe is, in turn, threadedly engaged with a handle connector 42. This connector is joined to the gauge body 11 by means of a flexible joint, shown as comprising a flexible pipe or tube 43, to which the connector and a neck 43a of the body are both secured by clamps 44 and 45, respectively, the clamp 44 providing a forward end loosely telescoping with the neck 43a to permit limited flexing between the body 11 and the elements 40, 41, and 42. The conductor cable 29 leads from the conductor terminal plate 38 in the chamber 12 through a longitudinal axial bore 46 formed in the body 11 and communicating with the chamber 12, then through the flexible tube 43, and a similar bore 42a in the connector 42, then through the pipe 41 and bore 40a in handle 40 to the source of current and to the indicating apparatus. These several bores and tube and pipe openings are in continuous and successive registry.

Referring again to Figure 7, the five conductor wires of the cable are indicated by the numerals 28b, 28b, 33, 34, and 35. Between conductors 33 and 35 are connected asymmetrical impedances, shown as two half-wave rectifiers 46 and 47 of equal impedance, with the anode of rectifier 46 connected by a series connection 48 to the cathode of rectifier 47. Conductor 34 leads from the secondary coil series connection 36a at 36 to a sensitive galvanometer 51 and conductor 52 leads thence to the series connection 48 between the two rectifiers.

In the operation of the measuring device, the gauge body is inserted within the casing, tubing, or other cylindrical work object to be measured. When, as normally, the internal diameter of the work is correct, the air gap 49 between the armature end 22a and the leg 30 of the E-shaped core 27 is equal to the air gap 49a between the armature end 22b and the leg 30'. The electromotive force induced in secondary coil 30a is then equal to that induced in secondary coil 30b. Since the rectifiers 46 and 47 are electric devices of equal impedance, the potential at 36 is equal to that at 48 and no current flows through the galvanometer, which indicates a zero reading. When, however, the plunger 17 moves outwardly, gap 49 is decreased, gap 49a is correspondingly increased, and the magnetic flux set up by the primary coil 28a through the middle core leg 28, core base, core leg 30, and armature end 22a is greater than that set up through the middle core leg 28, core base, core leg 30' and armature end 22b, in accordance with the well known principle that the reluctance of a magnetic circuit varies directly with the length of the air gap or gaps in the circuit. Since induced electromotive force varies directly with the magnetic flux, the induced electromotive force in secondary coil 30a is then greater than that in coil 30b. Since there has been no change in the relative impedance of the rectifiers, a difference in potential then exists between points 48 and 36 and a small current flows through the galvanometer. By reason of the action of the rectifiers, this current is direct current, and as direct current galvanometers are very sensitive, I gain the objective of a high degree of amplification through the use of the rectifiers.

These rectifiers 46 and 47 perform a double function in the operation of the gauge. They each provide impedance in that they afford internal resistance to the flow of current in the direction in which they are designed to permit such current flow. They also prevent any flow of current in the opposite direction, with the result that the current flowing through them is a direct current with a potential which varies from zero to a maximum with the same frequency as the alternating current impressed upon the primary. Since they are connected anode to cathode, there is a pulsating flow of current through both of them from terminal 31 to terminal 32 and always in that same direction. Since the internal resistances of the two rectifiers bear a constant ratio to each other which, in the embodiment shown and described herein, is equality and since this ratio of resistances is the same as the ratio of potentials normally generated in the secondaries 30a and 30b, it is obvious that, when the ratio of these two potentials varies from the normal, the current which passes through rectifier 46 is either more or less than the current which passes through rectifier 47, and the difference is represented by the current which flows through wires 34 and 52 and the galvanometer 51, which may be in either direction, depending upon which of the coils 30a and 30b generates the greater potential. It is obvious that the indicator needle of the galvanometer records the extent of the movement of the plunger 17, and it is a simple matter of calibration to design the mechanism to indicate in linear units the exact measurement of the movement of the plunger. When the plunger moves inwardly, an opposite set of conditions causes the galvanometer needle to move in the opposite direction. The armature 22 thus acts as a means for unbalancing the potential applied across the galvanometer terminals.

It has already been pointed out that the mechanical features of the gauge can be modified without departing from the principle of my invention. It is also apparent that modifications can be made in the electrical and magnetic features of the device within the scope of my invention. For example, instead of passing alternating current through the primary coil to energize the secondaries, the primary coil may be connected to a source of any other type of pulsating current or current of rapidly-varying potential. Thus, direct current in combination with an interrupter may be used.

I have described the secondary coils 30a and 30b as identical and, therefore, in conjunction with the energized primary coil 28a, these coils are sources of normally equal potential. And, I have described the rectifiers as having the same impedance relative to each other. It is apparent, however, that, if the two secondary coils are designed to normally impress two electric potentials bearing to each other any other definite ratio than equality, and the two rectifiers are designed to have impedance values bearing to each other the same definite ratio as that of the normally-impressed potentials, the gauge will operate as before, and it is to be understood that equality of potential and impedance is used only as one possible convenient and preferred illustration of such a definite ratio.

It is also apparent that, if I provide means for varying the impedance of the circuit between the points 31 and 48 of Figure 7, relative to the impedance between points 48 and 32, instead of providing means for varying the relative potentials of coils 30a and 30b, the gauge will operate properly, and that it is within the scope of my invention to vary either the relative potential or relative impedance, which in either case will vary the effective potential between series connections 36a and 48. It will also be observed that no means is provided for varying the impedance in the galvanometer circuit including the connections 34 and 52 so that the impedance between points 36 and 48 through the galvanometer is always the same.

There are a number of electrical measuring gauges which depend upon the variation of a magnetic circuit when the length of the air gap in the circuit is varied. Most of these instruments measure the change in a field of a coil when the reluctance of the magnetic circuit is varied by a changing air gap. A constant alternating current potential is applied to the coil and the current which flows through the coil will then be a function of the air gap. Any variation of the applied electromotive force also varies the current, with no change in air gap, so that a device of this kind, in order to function satisfactorily, must be supplied with a source of potential which is extremely constant. For use on ordinary lighting circuits, this requires some form of voltage regulator ahead of the instrument.

A gauge constructed in accordance with my invention avoids the necessity of such a voltage regulator. This is accomplished by utilizing a single primary coil to energize two secondary coils arranged in a bridge circuit of such a character that variations of the dimension of the gauged object vary the ratio of the two potentials generated in the two secondary coils. I provide a suitable meter for measuring this variation of ratio of the two potentials. It is obvious that, if the potential applied to the primary coil is increased or decreased, the two potentials generated in the two secondary coils respectively will increase and decrease correspondingly but, other factors being unchanged, the ratio between these two potentials will remain constant and such variation in the potential applied to the primary coil will not be indicated by the meter.

This application is a division of my application, Serial No. 163,807, filed September 14, 1937, now Patent No. 2,268,956.

I claim as my invention:

1. In an electric gauge, the combination of: a gauge housing comprising a body providing a chamber opening on the exterior of said body and a cover removably secured to said body to close said chamber; work-contacting means extending from said chamber to a position outside said housing; means for translating a change in position of said work-contacting means into a corresponding electrical change, said means including a stationary member in said chamber and a movable member in said chamber and operatively connected to said work-contacting means; means for securing said stationary member to said cover to be removable therewith; and means secured to said cover for guiding the movement of said movable member relative to said stationary member whereby said movable and stationary members are removable together from said chamber upon removal of said cover.

2. In an electric gauge, the combination of: a gauge housing comprising a body providing a chamber opening on the exterior of said body and a cover removably secured to said body to close said chamber; work-contacting means extending from said chamber through said cover to a position outside said housing; means for translating a change in position of said work-contacting means into a corresponding electrical change, said means including a stationary member in said chamber and a movable member in said chamber and operatively connected to said work-contacting means; means for securing said stationary member to said cover to be removable therewith; and means secured to said cover for guiding the movement of said movable member relative to said stationary member whereby said movable and stationary members and said work-contacting means are removable together from said chamber upon removal of said cover.

3. In an electric gauge, the combination of: a gauge housing comprising a body providing a chamber opening on the exterior of said body and a cover removably secured to said body to close said chamber; a plunger extending from said chamber through said cover to a position outside said housing; an electromagnetic core secured to said cover; an armature; means for mounting said armature for movement relative to said core to form a variable flux path, said means being secured to said cover to be removable therewith; and means for operatively connecting that portion of said plunger inside said chamber with said armature to create changes in reluctance of said flux path in response to movement of said plunger.

4. In an electric gauge, the combination of: a gauge housing comprising a body providing a chamber opening on the exterior of said body and a cover removably secured to said body to close said chamber; a work-engaging plunger extending from said chamber through said cover to a position outside said housing; an armature in said chamber; means removable with said cover for movably mounting said armature in such position that said plunger bears thereagainst; means for biasing said plunger for movement into pressural contact with said armature; an engagement means bearing against said armature; and means for biasing said engagement means in a direction tending to move said armature in opposition to said means for biasing said plunger.

5. In an electric gauge, the combination of: a gauge housing comprising a body providing a chamber opening on the exterior of said body and a cover removably secured to said body to close said chamber; a work-engaging plunger extending from said chamber through said cover to a position outside said housing; an armature in said chamber; means removable with said cover for movably mounting said armature in such position that said plunger bears thereagainst; means for biasing said plunger for movement into pressural contact with said armature; an engagement means bearing against said armature; means removable with said cover for guiding said engagement means; and means for biasing said engagement means in a direction tending to move said armature in opposition to said means for biasing said plunger.

6. In an electric gauge, the combination of: a gauge housing comprising a body providing a chamber opening on the exterior of said body and a cover removably secured to said body to close said chamber; an armature in said chamber; pivot means for pivoting said armature in said chamber for movement in either one of two directions; a work-engaging plunger extending from said chamber to a position outside said housing and positioned to engage said armature on one side of said pivot means; means for resiliently urging said plunger into engagement with said armature to exert thereon a moment tending to pivot said armature in one direction; an engagement means in said chamber and positioned to engage said armature on the other side of said pivot means; and means for resiliently urging said engagement means toward said armature to exert thereon a moment tending to pivot said armature in an opposite direction.

7. In an electric gauge, the combination of: a gauge housing comprising a body providing a chamber opening on the exterior of said body and a cover removably secured to said body to close said chamber; a variable-reluctance means including an armature in said chamber; pivot means secured to said cover for pivoting said armature in said chamber for movement in either one of two directions; a work-engaging plunger extending from said chamber to a position outside said housing through said cover and positioned to engage said armature on one side of said pivot means; resilient means acting between said cover and said plunger for resiliently urging said plunger into engagement with said armature to exert thereon a moment tending to pivot said armature in one direction; an engagement means in said chamber and positioned to engage said armature on the other side of said pivot means; and resilient means acting between said cover and said engagement means for resiliently urging said engagement means into engagement with said armature to exert thereon a moment tending to pivot said armature in an opposite direction whereby said armature is urged to a normal position by said resilient means and whereby said armature and said resilient means are removable from said body as a unit with said cover.

8. In an electric gauge, the combination of: a gauge housing comprising a body providing a chamber opening on the exterior of said body and a cover removably secured to said body to close said chamber; an electromagnetic core providing a base secured to said cover and providing three aligned arms extending inward into said chamber; pivot means secured to said cover adjacent the central one of said arms; an armature extending across said aligned arms and pivoted in said pivot means to present a substantially constant-reluctance flux path between said armature and said central arm and two variable-reluctance flux paths between said armature and the two outside arms of said core which last-named flux paths vary oppositely upon movement of said armature in a given direction; a work-engaging plunger extending from said chamber through said cover to a position outside said housing; and means for mounting said plunger for engagement with said armature and for bodily removal from said chamber with said cover.

9. In an electric gauge, the combination of: a gauge housing; an E-shaped magnetic core mounted in said housing and providing a central leg and two outer legs; a primary coil positioned around one of said legs; a secondary coil positioned around another of said legs; an armature pivotally mounted in said housing with its axis of oscillation adjacent and in the central transverse plane of said central leg and perpendicular to the central longitudinal plane of said core traversing said legs; a movable gauge element in mechanically operative relationship with said armature; and conductors leading from said gauge housing and electrically connected to said primary and secondary coils.

10. In an electric gauge, the combination of: a gauge housing; an E-shaped magnetic core mounted in said housing and providing a central leg and two outer legs; a primary coil positioned around said central leg; two secondary coils positioned respectively around said two outer legs; an armature pivotally mounted in said housing with its axis of oscillation adjacent and in the central transverse plane of said central leg and perpendicular to the central longitudinal plane of said core traversing said legs; a movable gauge element providing one end in contact with one end of said armature, the other end of said gauge element being disposed outside said housing to engage the work to be gauged; means for resiliently holding said gauge element in contact with said armature; and resilient means operatively connected to the other end of said armature for urging same in a direction to force said other end of said gauge element against the work to be gauged.

11. In an electric gauge, the combination of: a gauge body formed with a chamber; a cover for said internal chamber removably secured to said body; an electromagnet mounted on the inner wall of said cover; a movable armature mounted on said cover within said chamber; a gauge element movably mounted with respect to said cover and projecting therebeyond to contact the article to be gauged, said gauge element being in mechanically operative relationship with said armature; a conductor terminal plate carried by said cover inside said chamber; conductors leading from said electromagnet to said conductor terminal plate; and conductors leading from said conductor terminal plate to a position outside said body.

12. In an electric gauge for gauging the size of an article, the combination of: a gauge housing comprising a gauge body providing a chamber opening on the exterior thereof and a cover removably secured to said body to close said chamber, said body providing a bore communicating between said chamber and the exterior of said body; a handle means; a flexible joint operatively connecting said body and said handle means for permitting limited motion therebetween, said handle means providing a passage; electric means in said chamber; means for varying said electric means in response to changes in dimension of the article to be gauged; and conductors extending from said electric means through said bore and through said passage of said handle means.

13. A combination as defined in claim 12, in which said flexible joint comprises a flexible tube joining said handle means and said body and through which said conductors extend.

14. A combination as defined in claim 12, in which said flexible joint comprises a flexible tube joining said handle means and said body and through which said conductors extend, said body providing a neck extending into said flexible tube, and means extending from said handle means along the outside of said flexible tube to a position adjacent said neck to limit the flexing of said tube.

15. In an electric bore gauge, the combination of: a gauge housing formed with a longitudinal bore; a gauge element movably mounted with respect to said housing and adapted to contact an internal surface of the work to be gauged; an electromagnet mounted in the housing; means in mechanically operative relationship with the gauge element and said electromagnet to vary the electromagnetic relationship of said electromagnet; a handle connector formed with a bore therethrough; a flexible tube secured to said housing and said connector at its respective ends and with its two end openings in registry with said housing bore and said connector bore respectively; a gauge handle formed with a bore; a pipe detachably connected to said gauge handle and said handle connector at its respective ends and with its two end openings in registry with the handle bore and connector bore respectively; and electric conductors connected to the electromagnet and leading successively through the housing bore, flexible tube, connector bore, pipe, and handle bore to outside points.

16. A combination as defined in claim 2, in which said work-contacting means is disposed on one side of a plane transversely bisecting said body and including a pair of work-engaging elongated guide means extending from said body at peripheral positions substantially equidistant from said work-contacting means and on the opposite side of said plane.

17. In an electric gauge, the combination of: a gauge housing comprising a body providing a chamber opening on the exterior of said body and a cover removably secured to said body to close said chamber; work-contacting means extending from a position outside said cover through said cover and journalled with respect to said cover; means for translating a change in position of said work-contacting means into a corresponding electrical change, said means including a stationary member in said chamber formed of magnetic material and a movable armature formed of magnetic material and cooperating with said stationary member in forming a variable-reluctance flux path, the inner end of said work-contacting means being operatively associated with said armature; and means secured to said cover for movably mounting said armature to move relative to said stationary member to vary said flux path upon movement of said work-contacting means whereby said armature is removable with said cover.

18. A combination as defined in claim 12, in which said flexible joint comprises a flexible tube joining said handle means and said body and through which said conductors extend, said body providing a neck extending into one end of said flexible tube and said handle means providing a neck extending into the other end of said flexible tube, and including means extending around said flexible tube adjacent one of said necks and extending along the outside of said flexible tube to a position adjacent the other of said necks to limit the flexing of said tube.

RICARDO MESTAS.